(12) United States Patent
Kim

(10) Patent No.: US 7,567,311 B2
(45) Date of Patent: Jul. 28, 2009

(54) LIQUID CRYSTAL DISPLAY DEVICE

(75) Inventor: Sang Hyun Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 124 days.

(21) Appl. No.: 12/007,691

(22) Filed: Jan. 14, 2008

(65) Prior Publication Data

US 2008/0136987 A1 Jun. 12, 2008

Related U.S. Application Data

(62) Division of application No. 10/863,235, filed on Jun. 9, 2004, now Pat. No. 7,342,631.

(30) Foreign Application Priority Data

Jun. 27, 2003 (KR) .................. 10-2003-0042845

(51) Int. Cl.
*G02F 1/136* (2006.01)
*G02F 1/1343* (2006.01)
*G02F 1/1333* (2006.01)

(52) U.S. Cl. .................. 349/43; 349/138; 349/139

(58) Field of Classification Search ............... 349/141, 349/43, 138, 139
See application file for complete search history.

(56) References Cited

U.S. PATENT DOCUMENTS 5,642,212 A * 6/1997 Yamaue et al. ............. 349/41

6,894,754 B2 * 5/2005 Ueda ....................... 349/139
2002/0018152 A1 * 2/2002 Nagata et al. .............. 349/38

FOREIGN PATENT DOCUMENTS

| KR | 1020010001346 | 1/2001 |
|---|---|---|
| KR | 1020020057032 | 7/2002 |

OTHER PUBLICATIONS

Communication from Korean Patent Office.

* cited by examiner

*Primary Examiner*—David Nelms
*Assistant Examiner*—David Y Chung
(74) *Attorney, Agent, or Firm*—McKenna Long & Aldridge LLP

(57) ABSTRACT

A method of fabricating a liquid crystal display device includes forming a data bus line on a substrate, forming a preliminary interlayer insulating layer having a first thickness on the substrate including the data bus line, forming an interlayer insulating layer by etching the preliminary interlayer insulating layer to a second thickness less than the first thickness, the interlayer insulating layer having a planarized surface, sequentially forming a semiconductor layer, a gate insulating layer, and a gate electrode on the interlayer insulating layer, forming a passivation layer on the substrate, forming a plurality of contact holes exposing portions of the data bus line and the semiconductor layer by etching portions of the passivation layer, and forming a pixel electrode on the passivation layer.

5 Claims, 14 Drawing Sheets

LIQUID CRYSTAL DISPLAY DEVICE

This application is a divisional of application Ser. No. 10/863,235, filed Jun. 9, 2004 now U.S. Pat. No. 7,342,631, now allowed, which claims priority to Korean Patent Application No. 10-2003-0042845, filed Jun. 27, 2003, each of which are incorporated by reference for all purposes as if fully set forth herein.

The present invention claims the benefit of Korean Patent Application No. 42845/2003 filed in Korea on Jun. 27, 2003, which is hereby incorporated by reference.

BACKGROUND OF THE INVENTION

1. Field of the Invention

The present invention relates to a display device and a method of fabricating a display device, and more particularly to a liquid crystal display (LCD) device and a method of fabricating an LCD device.

2. Description of the Related Art

As demand for displaying information increases, demand for flat panel display devices having slim profiles, light weight, and low power consumption increases. Among the different types of flat panel display devices, LCD devices are commonly used for their superior color reproduction.

In general, an LCD device includes two substrates facing each other, wherein electrodes are formed on opposing facing surfaces of the two substrates, and a liquid crystal material is injected into a space defined between the two substrates. The LCD device displays images by applying a voltage between the electrodes on both the substrates to induce an electric field to the liquid crystal material, thereby changing alignment orientation of liquid crystal molecules of the liquid crystal material to vary light transmittance through the liquid crystal material.

The first of the two substrates of the LCD device includes a matrix array of thin film transistors (TFTs), wherein an active layer of each of the TFTs is generally formed of amorphous silicon (a-Si:H). This is because the amorphous silicon can be formed on large-sized glass substrates at relatively low temperatures.

However, some types of LCD devices employ TFTs using polycrystalline silicon (polysilicon) as an active layer. Since the polysilicon has an electric field effect mobility, which is 100 to 200 times greater than that of amorphous silicon, the LCD employing polysilicon TFTs has fast response speeds and stability against extreme temperature ranges and light. In addition, since driving circuits can be formed on the substrate, it is possible to reduce fabrication costs of the LCD device.

The polysilicon can be formed using various different methods, such as laser annealing, metal induced crystallization (MIC), and solid phase crystallization (SPC). During the laser annealing method, a laser beam is irradiated onto an amorphous silicon layer using an excimer laser while heating the substrate to a temperature of 250° C., thereby growing a polysilicon layer. During the MIC method, a metal film is deposited onto an amorphous silicon layer and a polysilicon layer is grown using the metal film as a seed for nucleation. During the SPC method, an amorphous silicon layer is annealed at high temperature for an extended period of time. In addition to these different types of methods, another method includes depositing a polysilicon layer directly onto a substrate.

Currently, a new crystallization method has been developed that uses sequential lateral solidification (SLS). The SLS method makes use of the fact that silicon grains grow along a perpendicular direction to a boundary between a liquid silicon regime and a solid silicon regime. In addition, during the SLS method, the energy level and irradiation range of a laser beam are properly controlled to control lateral grain growth along a predetermined length, thereby increasing the grain size.

FIGS. 1A to 1E are schematic cross sectional views of a method of fabricating a Buried Bus Coplanar (BBC) polysilicon TFT according to the related art. In FIG. 1A, a data bus line 130 of a first metal film is formed on a substrate 110.

In FIG. 1B, an interlayer insulating layer 135 formed of an inorganic material, such as SiNx or SiOx, or an organic insulator is formed on the data bus line 130 and the substrate 110. Then, a semiconductor layer 180 of polysilicon is formed having a predetermined pattern on the interlayer insulating layer 135.

In FIG. 1C, a gate insulating layer 125 of inorganic material is formed on the semiconductor 180 and the substrate 110. Then, a gate electrode 120 and a gate bus line (not shown) are formed on the gate insulating layer 125 by depositing a second metal film on the gate insulating layer 125 and patterning the second metal film. Next, $P^+$ impurity ions are implanted into the semiconductor layer 180 using the gate electrode 120 as a mask. Then, the implanted impurity ions are activated by a laser beam, thereby forming a source region and a drain region at predetermined portions of the semiconductor layer 180.

In FIG. 1D, a passivation layer 165 of inorganic or organic material is formed on the gate electrode 120 and the gate insulating layer 125. Then, a first contact hole exposing a part of the data bus line 130, and second and third contact holes 109b and 109c exposing a part of the semiconductor layer 180 are formed in the passivation layer 165.

In FIG. 1E, an indium tin oxide (ITO) layer is deposited on the passivation layer 165 including the first, second, and third contact holes 109a, 109b, and 109c, and is then patterned, thereby forming a pixel electrode 140 electrically in contact with the impurity-doped semiconductor layer 180. During formation of the pixel electrode 140, a source electrode 140a is formed by electrically connecting the data bus line 130 with the impurity-doped semiconductor layer 180 through the first contact hole 109a and the second contact hole 109b. In addition, a drain electrode is formed together with the pixel electrode 140 by the ITO layer filled within the third contact hole 109c.

Then, as the first, second, and third contact holes 109a, 109b, and 109c are formed, an exposed portion of the data bus line 130 and exposed portions of the semiconductor layer 180 are oxidized. Hence, contact resistance between the ITO layer filled within the first contact hole 109a and the exposed data bus line 130 increases. Similarly, contact resistance between the ITO layer filled within the second and third contact holes 109b and 109c and the exposed semiconductor layer 180 increases. Accordingly, the increased contact resistances causes signal delays, thereby reducing image quality and reliability of the LCD device.

In addition, the data bus line 130 including the source electrode is positioned below the semiconductor layer 180. After the data bus line 130 is formed, the interlayer insulating layer 135 is deposited at a thickness of 3,000 Å, and the semiconductor layer 180 is formed. Accordingly, the semiconductor layer 180 formed of amorphous silicon has different thicknesses between a stepped portion and a plane portion. Due to the different thicknesses, the polysilicon layer, which is crystallized by laser annealing of the amorphous silicon, becomes very thin at a predetermined portion so that non-uniform crystalline property of the active region and ablation phenomenon occur.

In FIG. 1D, the first contact hole 109a is formed by etching the passivation layer 165, the gate insulating layer 125, and the interlayer insulating layer 135 to expose a portion of the data bus line 130. The second and third contact holes 109b and 109c are formed by etching the passivation layer 165 and the gate insulating layer 125 to expose portions of the semiconductor layer 180. When the first, second, and third contact holes 109a, 109b, and 109c are formed, the impurity-doped semiconductor layer 180 is subject to etching damage, thereby deteriorating operational characteristics of the LCD device due to partial loss of semiconductor layer 180.

SUMMARY OF THE INVENTION

Accordingly, the present invention is directed to an LCD device and method of fabricating an LCD device that substantially obviates one or more problems due to limitations and disadvantages of the related art.

It is an object of the present invention is to provide an LCD device that prevents an increase of contact resistance and signal delay.

Another object of the present invention is to provide a method of fabricating an LCD device that prevents an increase of contact resistance and signal delay.

Another object of the present invention is to provide an LCD device having a reduced height difference within a stepped portion of a semiconductor layer.

Another object of the present invention is to provide a method of fabricating an LCD device that can minimize loss of a semiconductor layer.

To achieve these objects and other advantages and in accordance with the purpose of the invention, as embodied and broadly described, a method of fabricating a liquid crystal display device includes forming a data bus line, an interlayer insulating layer, a semiconductor layer, a gate insulating layer, and a gate electrode on a first surface of a substrate, forming a passivation layer on the substrate, forming a photoresist film on the passivation layer, forming a photoresist pattern from the photoresist film to expose portions of the passivation layer, etching the passivation layer to form a plurality of first contact holes exposing portions of the semiconductor layer and etching the passivation layer and the semiconductor layer to form a second contact hole exposing a portion of the data bus line, the photoresist pattern having a plurality of undercut regions corresponding to each of the first and second contact holes, depositing a first portion of a metal film on the photoresist pattern and a plurality of second portions of the metal film within each of the first and second contact holes, removing the photoresist pattern and the first portion the first metal film to leave the second portions of the first metal film within each of the first and second contact holes, forming a transparent electrode material on the passivation film, and patterning the transparent electrode material to form a pixel electrode within a first one of the plurality of first contact holes, and to form a source electrode having a first portion formed within a second one of the plurality of first contact holes and a second portion formed within the second contact hole.

In another aspect, a method of fabricating a liquid crystal display device includes forming a data bus line on a substrate, forming a preliminary interlayer insulating layer having a first thickness on the substrate including the data bus line, forming an interlayer insulating layer by etching the preliminary interlayer insulating layer to a second thickness less than the first thickness, the interlayer insulating layer having a planarized surface, sequentially forming a semiconductor layer, a gate insulating layer, and a gate electrode on the interlayer insulating layer, forming a passivation layer on the substrate, forming a plurality of contact holes exposing portions of the data bus line and the semiconductor layer by etching portions of the passivation layer, and forming a pixel electrode on the passivation layer.

In another aspect, a liquid crystal display device includes a substrate, a data bus line formed on the substrate, an interlayer insulating layer formed on the data bus line and the substrate, a semiconductor layer formed on the interlayer insulating layer, a gate insulating layer formed on the semiconductor layer, a gate electrode formed on the gate insulating layer above the semiconductor layer, a passivation layer formed on the gate electrode and the gate insulating layer, the passivation layer having a plurality of contact holes exposing portions of the data bus line and the semiconductor layer, a metal film formed on the data bus line and the semiconductor layer within the contact holes, and a pixel electrode formed on the passivation layer and electrically connected to the metal film within one of the contact holes on the semiconductor layer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1A:
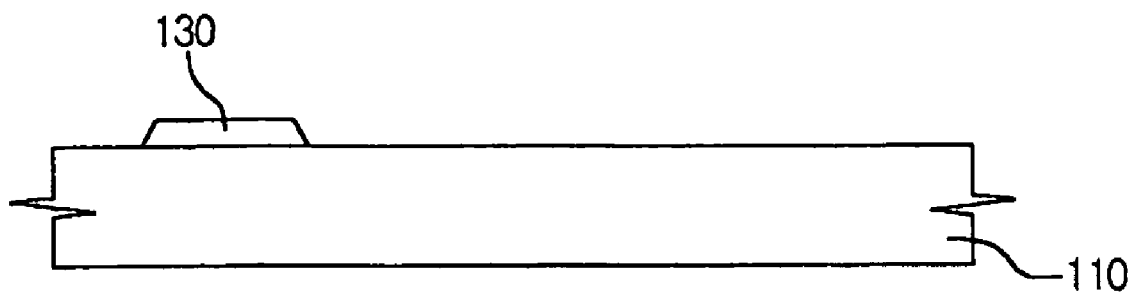
FIGS. 1A to 1E are schematic cross sectional views of a method of fabricating a Buried Bus Coplanar (BBC) polysilicon TFT according to the related art.
Figure 1B:
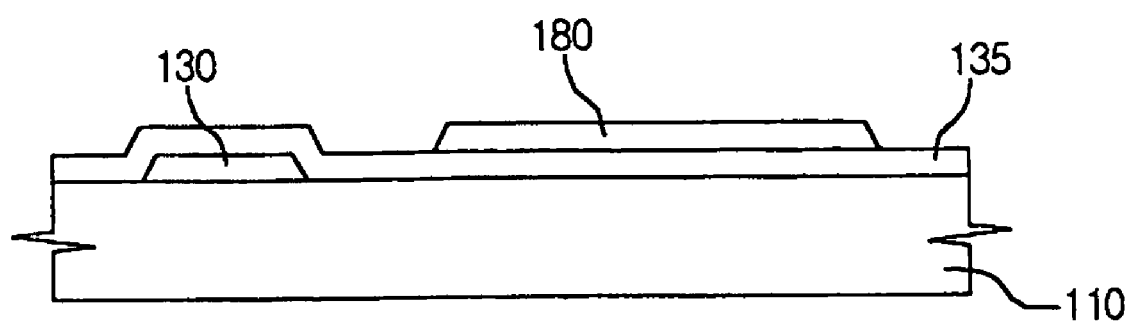
Figure 1C:
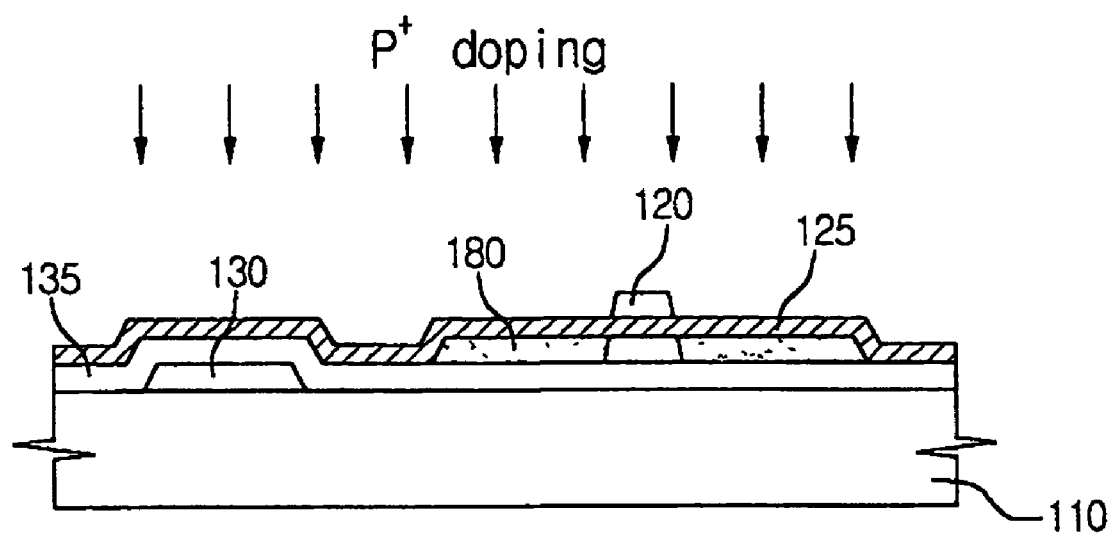
Figure 1D:
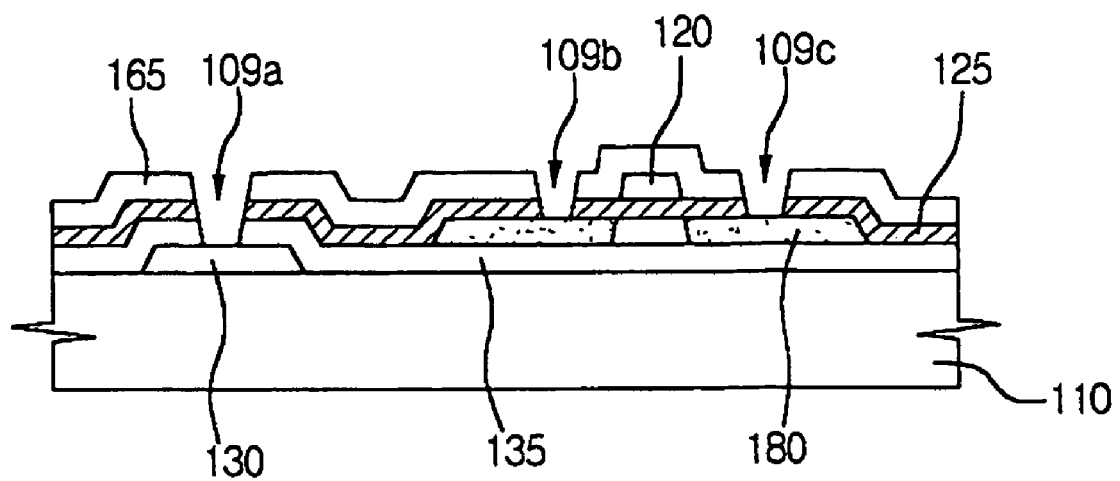
Figure 1E:
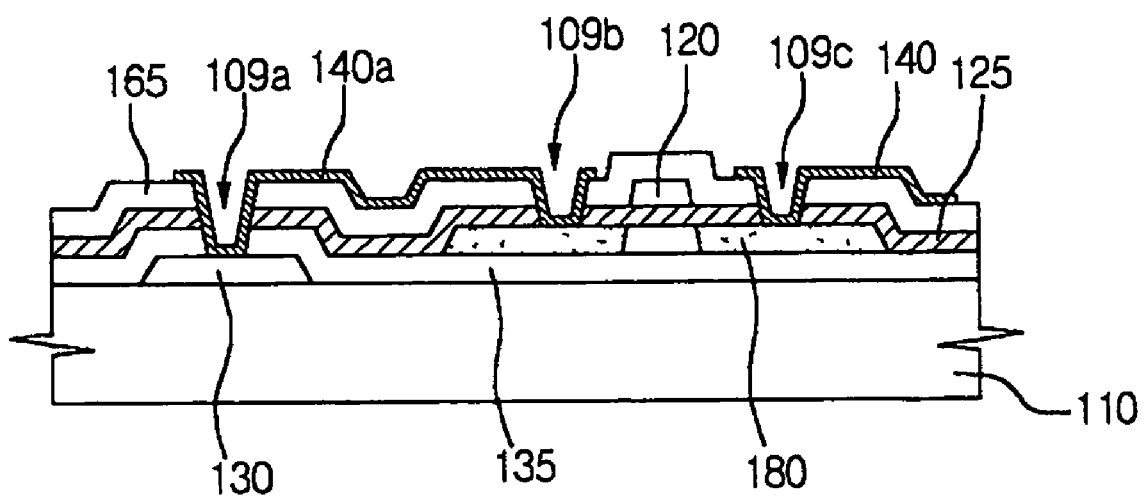
Figure 2:
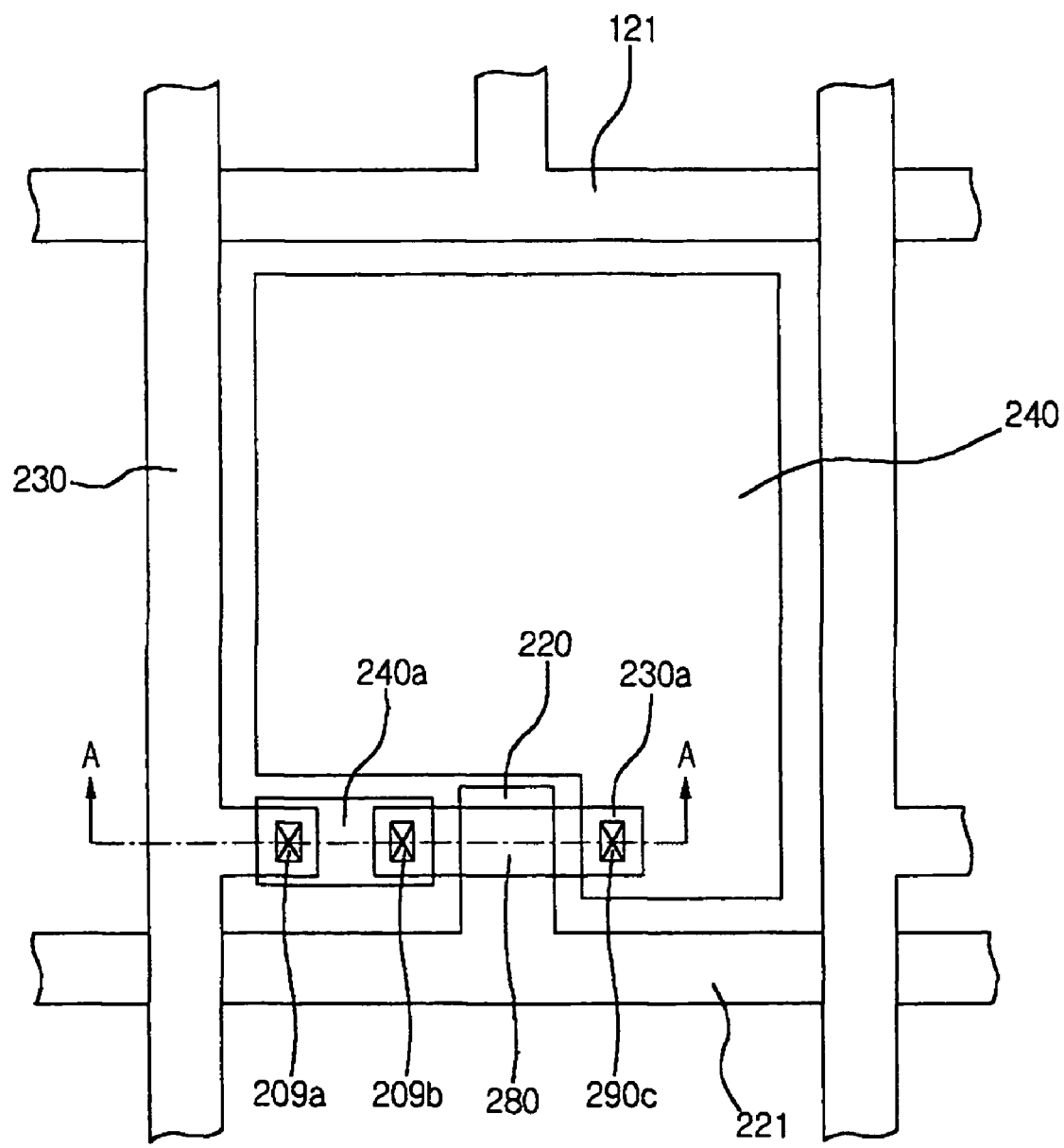
FIG. 2 is a schematic plan view of an exemplary array substrate of an LCD device according to the present invention.

FIG. 2 is a schematic plan view of an exemplary array substrate of an LCD device according to the present invention. In FIG. 2, an LCD device 200 may include a pixel electrode 240 formed at a crossing region of a gate bus line 221 and a data bus line 230. The pixel electrode 240 may electrically contact a TFT having a gate electrode 220, a source electrode 240a, a drain electrode 230a, and a semiconductor layer 280.

Figure 3A:
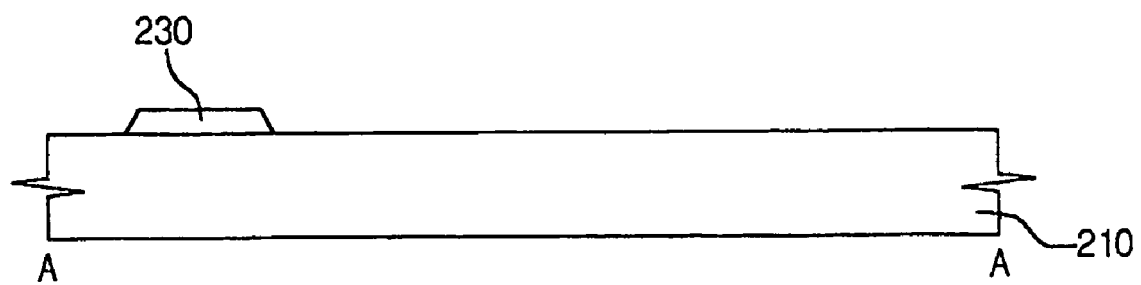
FIGS. 3A to 3H are cross sectional views along I-I' of FIG. 2 of an exemplary method of fabricating an array substrate of an LCD device according to the present invention.

FIGS. 3A to 3H are cross sectional views along I-I' of FIG. 2 of an exemplary method of fabricating an array substrate of an LCD device according to the present invention. In FIG. 3A, a pattern of the data bus line 230 may be formed of a first metal film on a substrate 210.

Figure 3B:
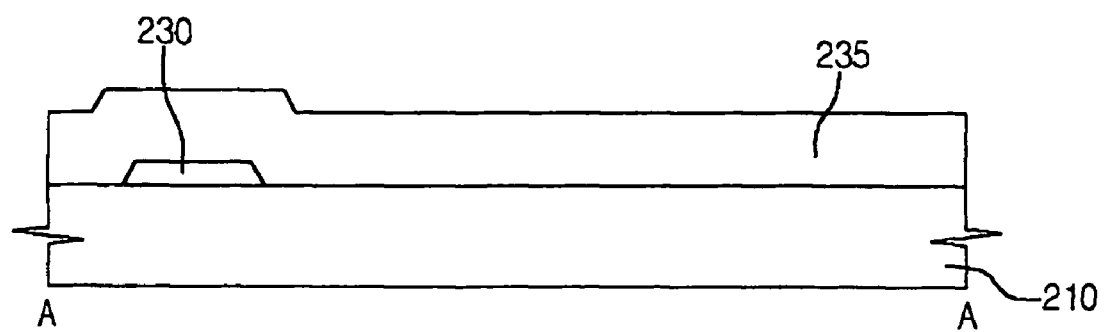

In FIG. 3B, an interlayer insulating layer 235 may be formed of an inorganic or organic insulating material to cover the data bus line 230. For example, the interlayer insulating layer 235 may be deposited onto the substrate 210 at a thickness greater than a thickness of the data bus line 230, such as about 4000 Å to about 8000 Å.

Figure 3C:
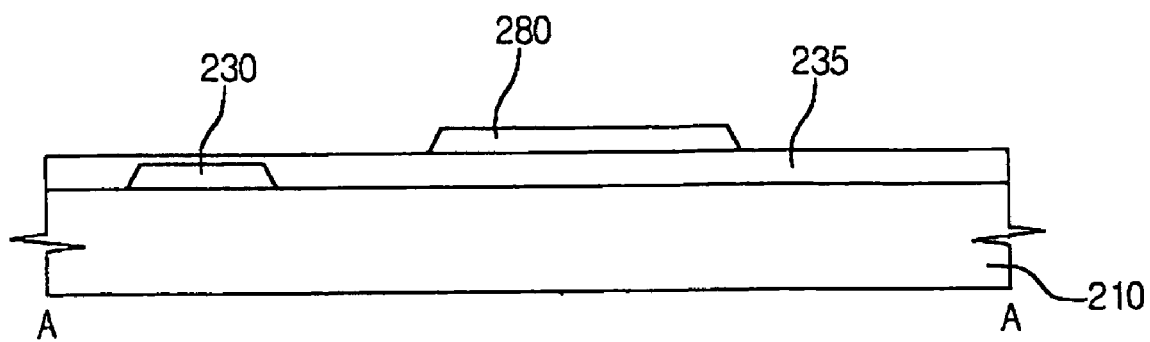

In FIG. 3C, the interlayer insulating layer 235 may be etched using an etching process to reduce the thickness of the interlayer insulating layer 235, and to planarize the interlayer insulating layer 235. For example, the etching process may be performed using dry or wet etching. Alternatively, the interlayer insulating layer 235 may be planarized using a chemical and mechanical polishing (CMP) process. Accordingly, the interlayer insulating layer 235 is planarized until the interlayer insulating layer 235 has a height similar to a height with a peripheral region of the LCD device.

Alternatively, the interlayer insulating layer 235 may be formed of a dual layer using Spin-On-Glass (SOG) including SiNx, SiOx, or PE-oxide based materials, and etched. For example, SiNx or PE-oxide based material may be deposited onto the substrate 210 to a first thickness, and then SOG may be deposited to form the dual layer of SiNx or PE-oxide based material and SOG. Then, the dual layer may be annealed to remove carbon (C) components to enhance density, and may be etched for planarization.

Further, after the SOG is deposited onto the substrate 210 having a second thickness and is planarized, SiNx or PE-oxide based materials may be again deposited or only the SOG may be re-deposited.

In FIG. 3C, the semiconductor layer 280 may be formed of polysilicon on the planarized interlayer insulating layer 235 to have a patterned shape.

Figure 3D:
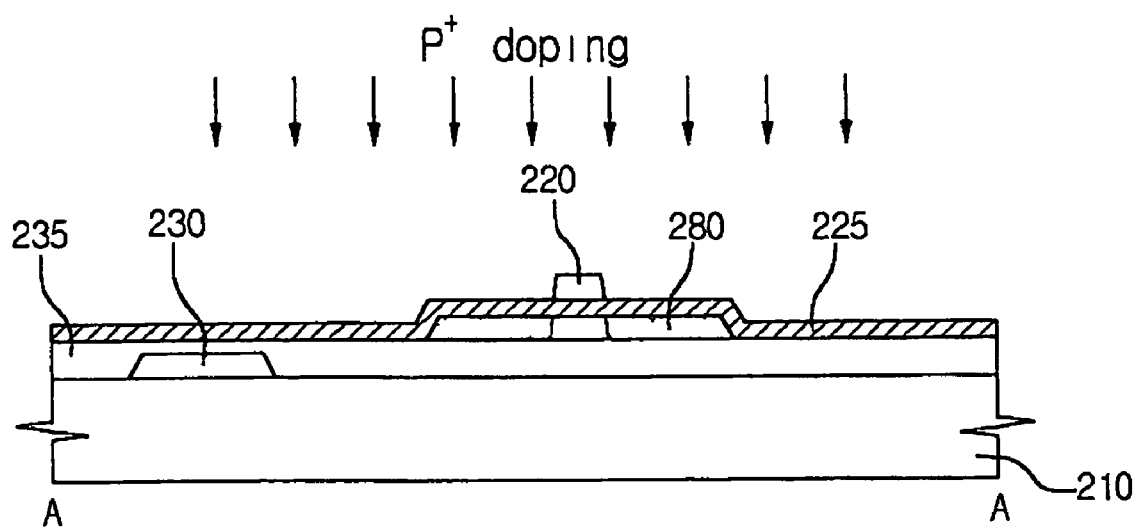

In FIG. 3D, a gate insulating layer 225 may be formed of an inorganic insulating layer onto the substrate 210 having the semiconductor layer 280. Then, a second metal film may be deposited onto the gate insulating layer 225, and patterned to form the gate electrode 220 and the gate bus line (not shown). Next, P$^+$ ions may be doped into the semiconductor layer 280 using the patterned second metal film as a mask. Then, a laser beam may be irradiated onto the doped semiconductor layer 280 to form source/drain regions. Accordingly, irradiation of the laser beam may anneal damage to the semiconductor layer 280 caused during the doping of the P$^+$ ions, and the P$^+$ ions may be activated.

Figure 3E:
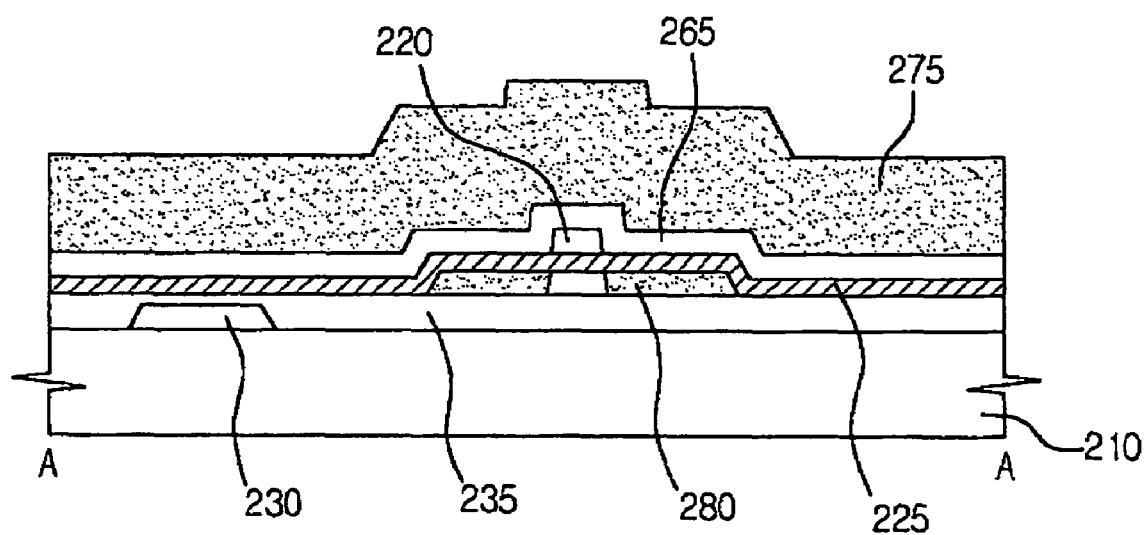

In FIG. 3E, a passivation layer 265 formed of an inorganic or organic insulating material and a photoresist film 275 may be formed to cover the gate electrode 220 and the gate insulating layer 225. The passivation layer 265 may prevent the TFT from being damaged or degraded due to subsequent rubbing processing of LCD cells of the LCD device. In addition, the passivation layer 265 may prevent formation of scratches and moisture permeation during subsequent processing of the LCD device. For example, the passivation layer 265 may be formed of silicon nitride or BenzoCyclo-Butene (BCB), which is an organic insulating material.

Then, the photoresist film 275 may be exposed to UV light using a mask having a predetermined pattern. Here, UV light may be used to subsequently form contact holes. Next, the photoresist film 275 may be exposed and developed using a developer, thereby removing the exposed portions of the photoresist film 275. After that, the resultant structure may be etched.

Figure 3F:
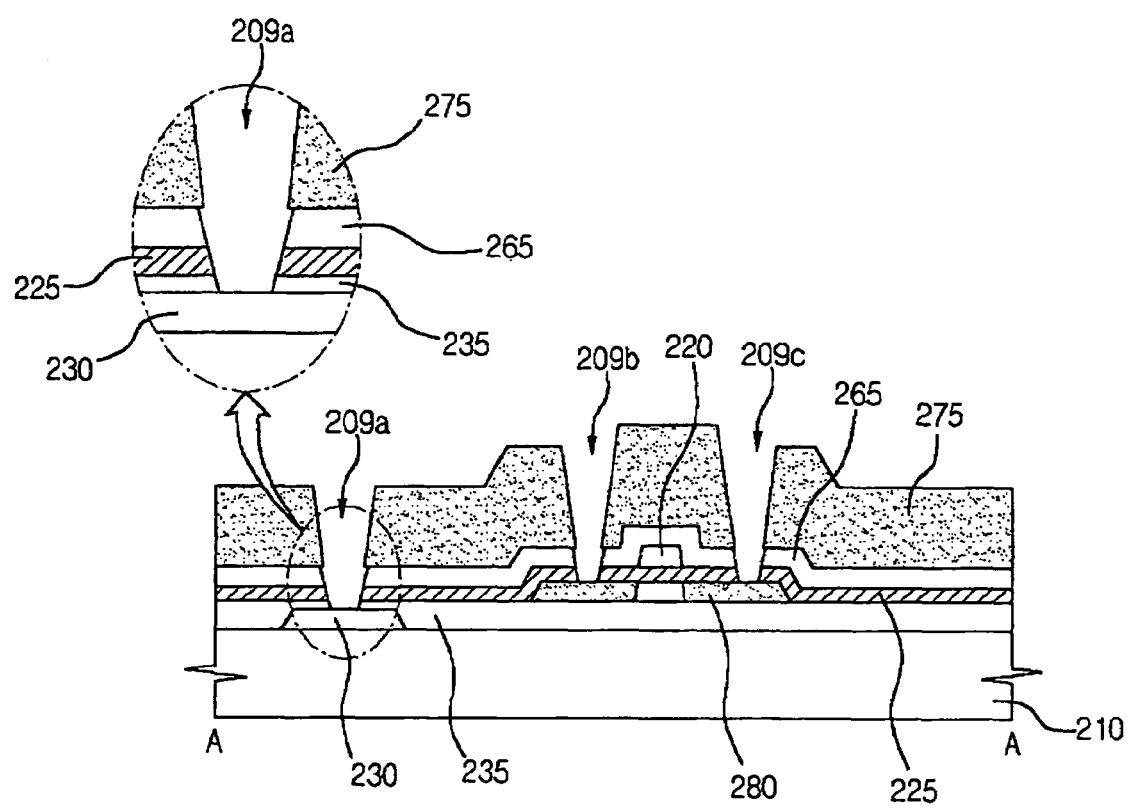

In FIG. 3F, exposed portions of the passivation layer 265, the gate insulating layer 225, and the interlayer insulating layer 235 may be wet-etched. Accordingly, a first contact hole 209a may be formed to expose a portion of the data bus line 230, and second and third contact holes 209b and 209c may be formed to expose portions of the doped semiconductor layer 280. In addition, the etched portions of the photoresist film 275 may be undercut due to relational wet-etching characteristics of the passivation layer 265 and the photoresist film 275. The undercut may prevent a subsequently-formed metal film from being deposited onto the undercut portion of the photoresist film 275 when the metal film to be lifted off is deposited onto the resultant structure of the substrate 210.

Figure 3G:
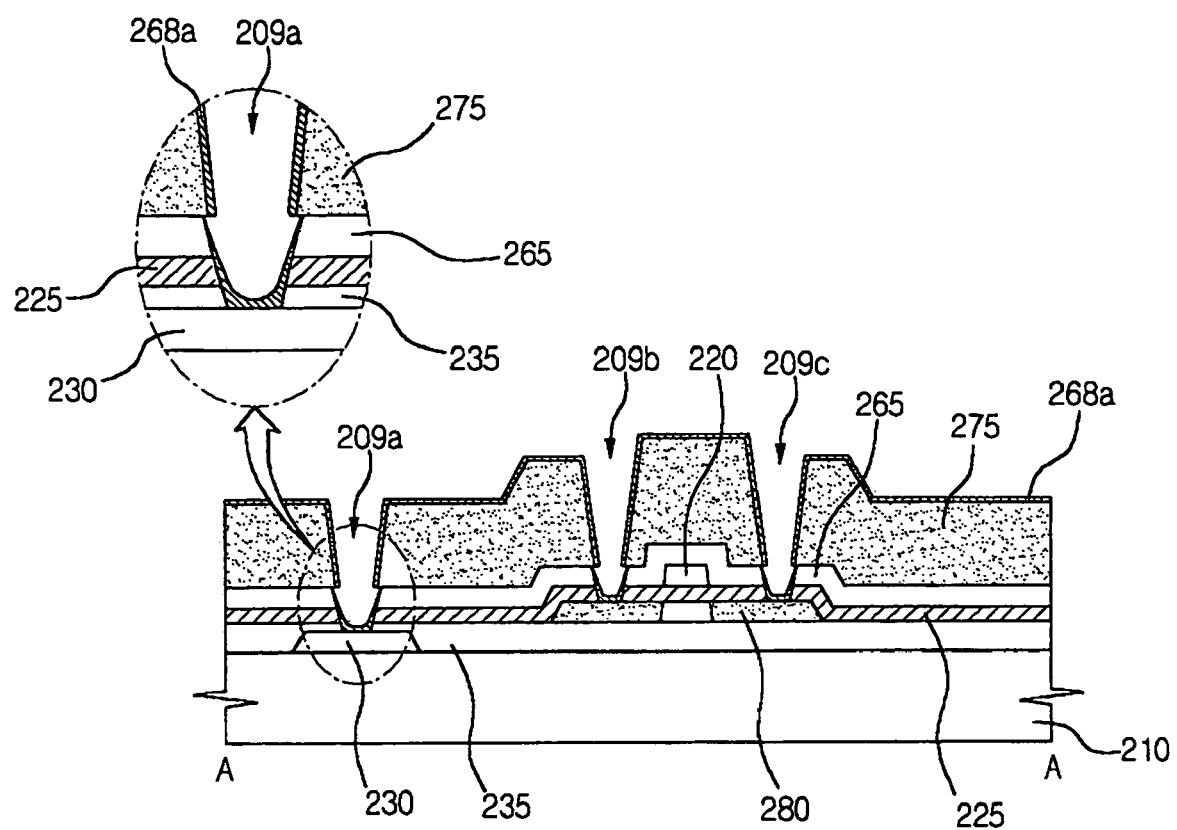

In FIG. 3G, a metal film 268a may be deposited onto the photoresist pattern 275 having the first, second, and third contact holes 209a, 209b, and 209c. For example, the metal film 268a may be deposited using a sputtering method. The metal film 268a may be formed of an oxidation-resistant metal, such as chromium (Cr), molybdenum (Mo), tungsten (W), titanium (Ti)-based material, or an aluminum alloy. Then, the photoresist film 275 may be removed using a stripper, wherein the photoresist pattern 275 may be removed and portions of the metal film 268a deposited on the photoresist pattern 275 may be removed using a lift-off process. The lift-off process using the photoresist film 275 is advantageous in that the stripper easily permeates into the photoresist film 275 through the undercut portions to melt the photoresist film 275, thereby providing a clean, clear pattern.

Figure 3H:
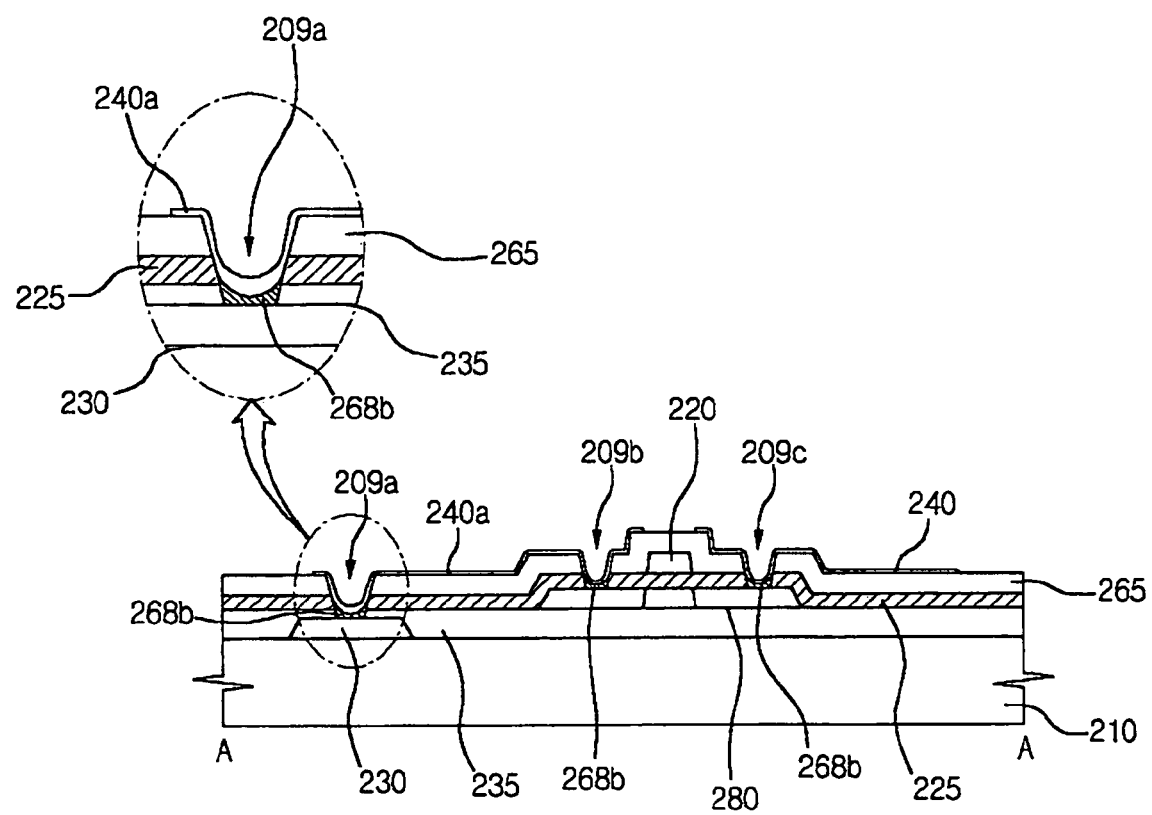

Then, a thin metal film 268b may be deposited into the first, second, and third contact holes 209a, 209b, and 209c (in FIG. 3H). Accordingly, the thin metal film 268b may partially remain to contact the data bus line 230 and the semiconductor layer 280. The thin metal film 268b may have oxidation-resistance, thereby preventing surface oxidation on the data bus line 230 and the semiconductor layer 280. Thus, increased contact resistance between a subsequently-formed pixel electrode and the semiconductor layer 280 may be prevented.

In FIG. 3H, a transparent conductive material may be formed within the first, second, and third contact holes 209a, 209b, and 209c. Then, the transparent conductive material may be patterned to form a pixel electrode 240 that contacts the doped semiconductor layer 280. For example, indium-tin-oxide (ITO) may be used as the transparent conductive material for forming the pixel electrode 240. Furthermore, indium-zinc-oxide (IZO) or indium-tin-zinc-oxide (ITZO) may also be used as the transparent conductive material.

When the pixel electrode 240 is formed, a source electrode 240a may be formed to connect the data bus line 230 with the doped semiconductor layer 280 through the first contact hole 209a and the second contact hole 209b. In addition, the drain electrode may be formed to contact the pixel electrode 240 through the third contact hole 209c.

According to the present invention, during fabrication of an LCD device, a lift-off process may be used to deposit the oxidation-resistant metal film within contact holes without using a separate mask, thereby preventing surface oxidation. Accordingly, since exposed surfaces of the data bus line and the semiconductor layer may not be oxidized, contact resistance may not increase and signal delay may be prevented, thereby minimizing product failure and improving productivity.

According to the present invention, during fabrication of an LCD device, a step portion that is generated when an insulating layer is formed may be planarized, thereby preventing loss of a semiconductor layer due to formation of contact holes and preventing disconnection during crystallization of the semiconductor layer, thereby improving product reliability.

It will be apparent to those skilled in the art that various modifications and variations can be made in LCD device and method of fabricating an LCD device of the present invention without departing from the spirit or scope of the invention. Thus, it is intended that the present invention covers the modifications and variations of this invention provided they come within the scope of the appended claims and their equivalents.

What is claimed is:

1. liquid crystal display device, comprising:
a substrate;
a data bus line formed on the substrate;
an interlayer insulating layer formed on the data bus line and the substrate;
a semiconductor layer formed on the interlayer insulating layer;
a gate insulating layer formed on the semiconductor layer;
a gate electrode formed on the gate insulating layer above the semiconductor layer;
a passivation layer formed on the gate electrode and the gate insulating layer, the passivation layer having a plurality of contact holes exposing portions of the data bus line and the semiconductor layer;
a metal film formed on the data bus line and the semiconductor layer within the contact holes; and
a pixel electrode formed on the passivation layer and electrically connected to the metal film within one of the contact holes on the semiconductor layer,
wherein the interlayer insulating layer has a height similar to a peripheral region.

2. he device according to claim 1, wherein the interlayer insulating layer includes at least one selected from a group consisting of SOG (Spin on glass), SiNx, SiOx, and PE-oxide.

3. The device according to claim 1, wherein the plurality of contact holes include a first contact hole that exposes a portion of the data bus line, and second and third contact holes that expose portions of the semiconductor layer.

4. The device according to claim 3, wherein the metal film includes an oxidation-resistant material.

5. The device according to claim 4, wherein the metal film includes one selected from a group consisting of Cr, Mo, W, Ti-based material, and an aluminum alloy.

* * * * *